United States Patent [19]

Gattey et al.

[11] Patent Number: 4,926,961

[45] Date of Patent: May 22, 1990

[54] HINGED ACOUSTICAL VOICE TUBE

[75] Inventors: Phillip Gattey, Los Gatos; Shu-Ren Chen, Santa Cruz, both of Calif.

[73] Assignee: ACS Communications, Scotts Valley, Calif.

[21] Appl. No.: 226,146

[22] Filed: Jul. 29, 1988

[51] Int. Cl.⁵ .............................................. G10K 11/00
[52] U.S. Cl. ........................................ 181/22; 181/18; 181/20
[58] Field of Search .............................. 181/18, 20-22, 181/126, 131, 137, 138; 379/430; 285/233

[56] References Cited

U.S. PATENT DOCUMENTS

| | | | |
|---|---|---|---|
| 1,148,781 | 8/1915 | Pridham et al. | 379/430 |
| 3,548,118 | 12/1970 | Hutchings | 379/430 |
| 3,993,879 | 11/1976 | Larkin | 181/20 X |
| 4,090,042 | 5/1978 | Larkin | 181/20 X |
| 4,118,606 | 10/1978 | Larkin | 181/20 X |

FOREIGN PATENT DOCUMENTS

| | | | |
|---|---|---|---|
| 1296902 | 6/1969 | Fed. Rep. of Germany | 285/283 |
| 7596 | of 1915 | United Kingdom | 181/126 |

Primary Examiner—B. R. Fuller
Attorney, Agent, or Firm—Limbach, Limbach & Sutton

[57] ABSTRACT

An acoustical voice tube, comprising an acoustical hollow upper piece and an acoustical hollow lower piece in hinged connection permits voice or sound tube positioning over a large area without changing the sound characteristics.

9 Claims, 4 Drawing Sheets

HINGED ACOUSTICAL VOICE TUBE

BACKGROUND OF THE INVENTION

1. Field of the Invention

The present invention relates to acoustical communications headsets and, in particular, to an adjustable, light-weight voice tube for such a headset.

2. Discussion of the Prior Art

Prior art acoustical communication headsets incorporate an acoustical tube or "voice tube" to carry sound to the microphone in the housing. In all such devices, some accommodation must be made so that the end of the tube is near the user's mouth, regardless of differences in anatomy between users. Typically, this accommodation involves the use of a sliding, trombone-like attachment. One such attachment being described in U.S. Pat. No. 3,548,118 issued to Hutchings. Other examples can be found in U.S. Pat. Nos. 3,993,879, 4,090,042, and 4,118,606 issued to Larkin.

A major problem with trombone-type voice tubes is that they produce a change in voice level when adjusted, much like the change in sound achieved with the slide in the musical instrument. These changes in voice level are unsuitable for oral communication, particularly in those cases where the sound must be transmitted over standardized equipment such as telephone lines.

SUMMARY OF THE INVENTION AND OBJECTS

It is a general object of the present invention to provide a lightweight acoustical voice tube which can be used with a communication headset.

It is another object of the present invention to provide an acoustical voice tube which is adjustable so as to accommodate the differences in anatomy of the voice tube user.

It is another object of the present invention to provide an acoustical voice tube where adjustments made to accommodate the user do not impact sound quality or sound level.

In general, the above and other objects of the invention are achieved by an acoustical voice tube for use with communication equipment which comprises a hollow, acoustical upper piece having an upper end for detachable coupling with the communication equipment and a lower end, and a lower piece having a lower end adapted for receiving sound and an upper end adapted to accommodate the lower end of the upper piece so as to create a hinged connection between the upper and lower pieces.

DESCRIPTION OF THE PREFERRED EMBODIMENT

Figure 1:
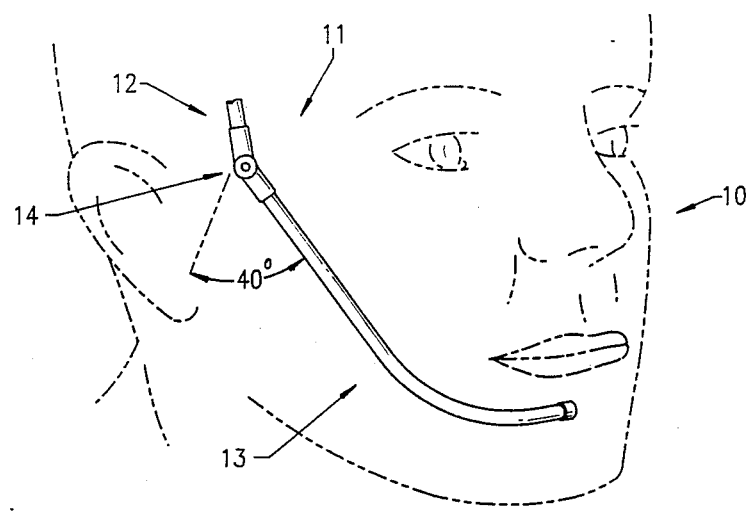
FIG. 1 is a pictorial view illustrating an acoustical voice tube in accordance with the present invention as it would be placed in relation to a user of communication equipment.

Referring to FIG. 1, a user (10) is shown with an acoustical voice tube (11) placed in proper relation to the user's mouth and ear, for use with communication equipment (not shown). The voice tube is comprised of a hollow upper piece (12) and a hollow lower piece (13) in hinged connection (14). The hinged connection allows for flexure of 40° (arrows) without undue effort and yet is tight enough to maintain a set position after adjustment.

Figure 2A:
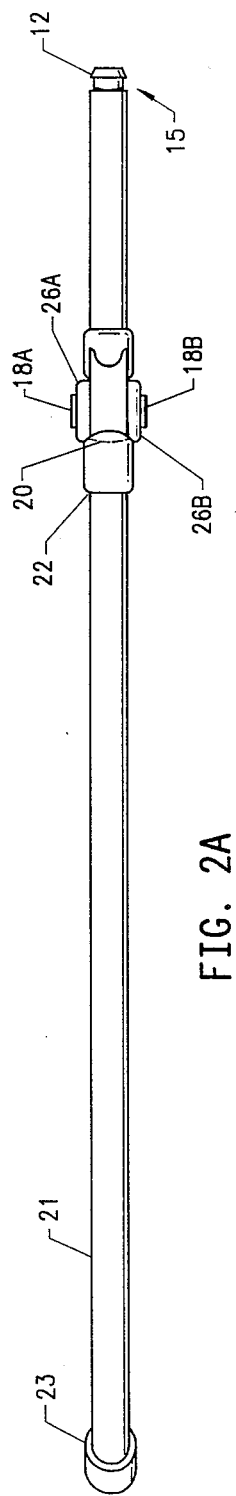
FIG. 2A is an enlarged underside view illustrating the acoustical voice tube showing the hinged connection between the upper and lower pieces.
Figure 2B:
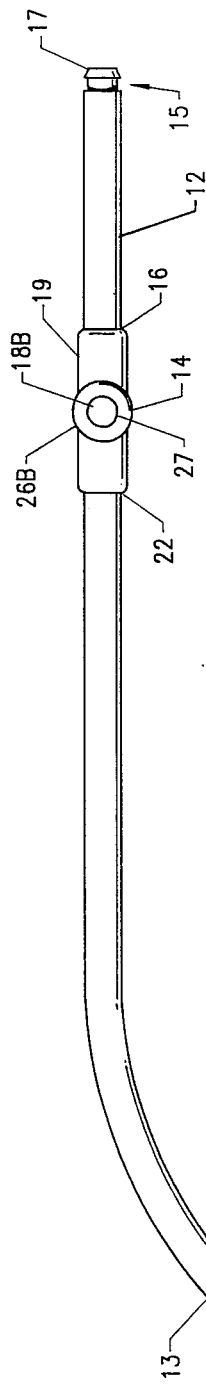
FIG. 2B is an enlarged side view of the acoustical voice tube showing the hinged connection between the upper and lower pieces as well as the sound filter.
Figure 2C:
FIG. 2C is an enlarged view of the sound filter showing the filter screen.

Referring to FIGS. 2A–2C, the upper piece (12) consists of an upper end (15) and a lower end (16). Detachable air-tight coupling and pivotal air-tight rotation of the upper piece (12) in relation to the communication equipment is provided by a rounded notch (17). The lower end (16) of the upper piece (12) has two convex protrusions (18A and 18B), thickened side walls (19) and a rounded, knuckled tip (20).

The lower piece (13) has a lower end (21) and an upper end (22). The lower end (21) of the lower piece (13) is adapted for receiving sound, having an end filter (23) to serve as an acoustical resistor. The end filter dampens acoustical resonances by virtue of a filter screen (24) secured by a filter housing (25). The upper end (22) of the lower piece (13) has partially cylindrical side walls (26A and 26B) with a radial axis in a perpendicular relationship to the hollow acoustical upper piece (12). The cylindrical sidewalls (26A and 26B) have bores (27) in a parallel relationship to the radial axis and aligned for air-tight coupling with the two convex protrusions (18A and 18B) of the lower end (16) of the upper piece (12) creating a hinged connection (14) between the lower piece (13) and upper piece (12).

In the preferred embodiment, the length of the upper piece (12) is less than one-third the length of the lower piece (13) and the lower piece (13) is curved. The diameter of the hollow, acoustical upper piece (12) and the diameter of the hollow, acoustical lower piece (13) are the same and are less than one-eight of one inch. The lower piece (13) and upper piece (12) are made of clear, impact resistant plastic material.

Figure 3:
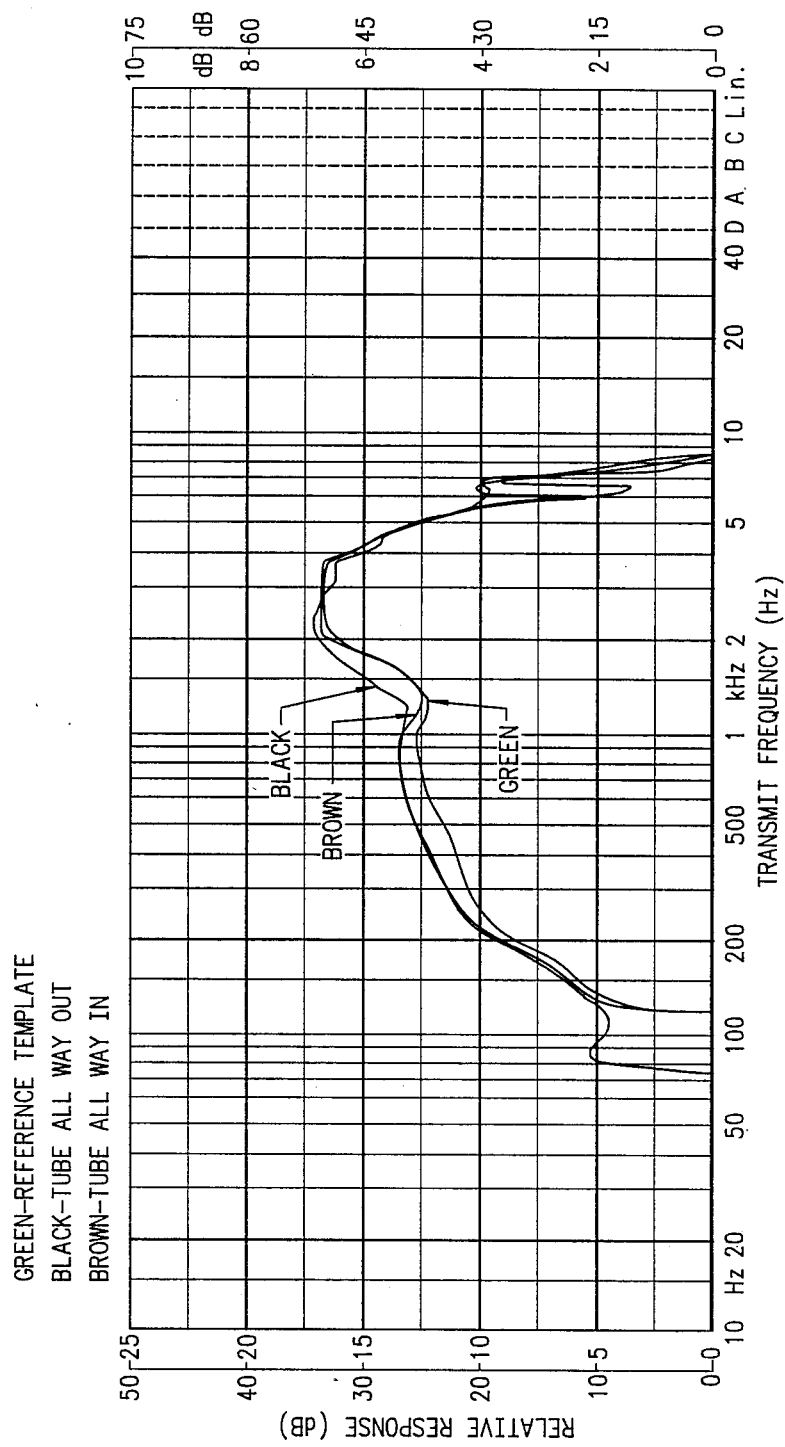
FIG. 3 is the transmit frequency response template of a prior art trombone voice tube in various positions of adjustment.

Referring now to FIG. 3, the loss of sound level upon adjusting the position of prior art trombone type voice tubes is demonstrated on a frequency response graph. The y axis measures the relative response in decibels (dB) while the x axis measures the transmit frequency in hertz (Hz). The line designated "green" is the reference template. The line designated "black" shows the transmit frequency response of the trombone type voice tube when it is adjusted so that the lower tube is fully extended. The line designated "brown" shows the transmit frequency response of the trombone type voice tube when it is adjusted so that the lower tube is all the way in. It is clear that the response at any particular frequency is dependent on the adjusted position of the trombone type voice tube.

Figure 4:
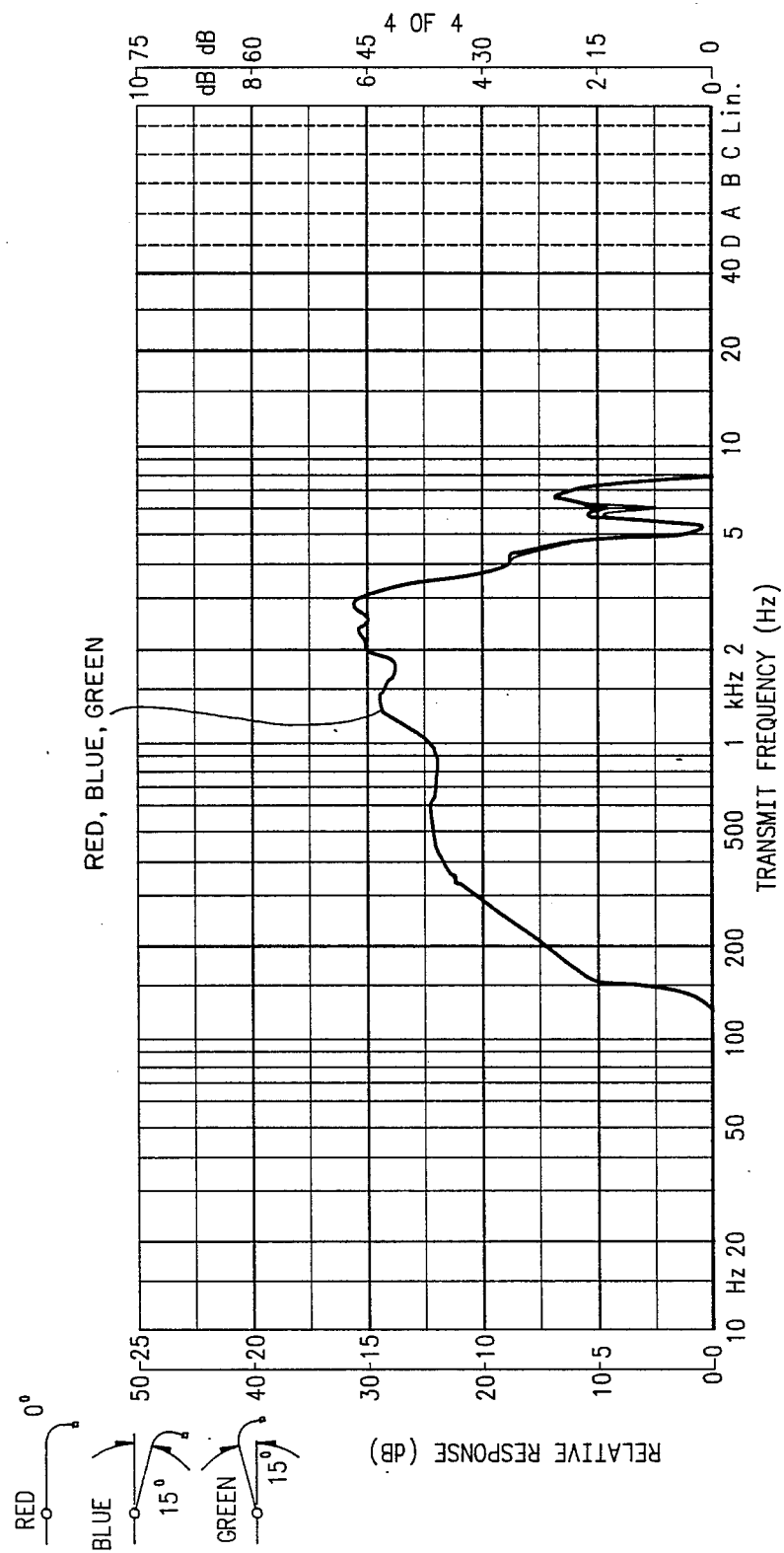
FIG. 4 is the transmit frequency response template of the present invention in various positions of adjustment.

Referring now to FIG. 4, the frequency response for the hinged voice tube of the present invention is shown to be independent of the adjusted position of the tube. Again, the y axis measures the relative response in decibels (dB) and the x axis measures the transmit frequency in hertz (Hz). The acoustical voice tube was evaluated where the hinged connection (14) was positioned so that the angle created by the upper piece (12) and lower piece (13) was 0°, 15° down, and 15° up. It is clear that the response at any particular frequency is exactly the same regardless of the adjusted position of the acoustical voice tube. Flexure of 30° occurs without change in the frequency response or sound pressure level, i.e. sound level. In combination with the pivotal rotation of the upper piece, the acoustical hinged connection permits voice or sound tube positioning over a large area without changing the sound characteristics.

What is claimed is:

1. An acoustical voice tube for use with communications equipment, comprising:
    a hollow, acoustical upper piece having an upper end for detachable coupling with the communications equipment and a lower end with at least one convex protrusion;
    a hollow, acoustical lower piece having a lower end adapted for receiving sound and an upper end having at least one bore aligned for air-tight coupling with said convex protrusion of said lower end of said upper piece and thereby creating a hinged connection between said upper piece and said lower piece.

2. An acoustical voice tube as in claim 1 wherein the hinged connection between upper piece and lower piece allows said lower end of said lower piece upon received sound from a sound source to cause said sound to remain substantially constant in the lower and upper pieces.

3. An acoustical voice tube as in claim 1 wherein said upper end of said upper piece is notched and rounded so as to allow for rotation of the acoustical tube in relation to the communications equipment.

4. An acoustical voice tube as in claim 1 wherein upper end of lower piece has partially cylindrical side walls with a radial axis in a perpendicular relationship to the hollow acoustical upper piece and two bores in a parallel relationship to the radial axis, and a lower end of said upper piece having two convex protrusions aligned so as to fit the two bores in the partially cylindrical side walls of the upper end of lower piece.

5. An acoustical voice tube as in claim 1 wherein the lower piece is curved.

6. An acoustical voice tube as in claim 1 wherein the diameter of the hollow, acoustical upper piece and the diameter of the hollow, acoustical lower piece are less than ⅛ inch.

7. An acoustical voice tube as in claim 1 wherein the lower end of upper piece is rounded and knuckled, and has thickened side walls.

8. An acoustical voice tube as in claim 1 wherein the lower piece and upper piece are constructed of a plastic material.

9. An acoustical voice tube as in claim 8 wherein the plastic material is clear and impact resistant.

* * * * *

UNITED STATES PATENT AND TRADEMARK OFFICE
CERTIFICATE OF CORRECTION

PATENT NO. : 4,926,961

DATED : May 22, 1990

INVENTOR(S) : Gattey et al.

It is certified that error appears in the above-identified patent and that said Letters Patent is hereby corrected as shown below:

In column 2, line 46, "one-eight" should be --one-eighth--.

Signed and Sealed this

Seventeenth Day of December, 1991

Attest:

*Attesting Officer*

HARRY F. MANBECK, JR.

*Commissioner of Patents and Trademarks*